(12) United States Patent
Thiele

(10) Patent No.: US 8,369,710 B2
(45) Date of Patent: *Feb. 5, 2013

(54) DATA PROCESSING NETWORK HAVING AN OPTICAL NETWORK INTERFACE

(75) Inventor: Matthew J. Thiele, Hampstead, NH (US)

(73) Assignee: Wisterium Development LLC, Wilmington, DE (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/355,437

(22) Filed: Jan. 16, 2009

(65) Prior Publication Data

US 2011/0229142 A9    Sep. 22, 2011

Related U.S. Application Data

(63) Continuation of application No. 10/529,983, filed as application No. PCT/US03/26956 on Aug. 28, 2003, now Pat. No. 7,480,461.

(60) Provisional application No. 60/406,831, filed on Aug. 29, 2002.

(51) Int. Cl.
*H04B 10/00* (2006.01)

(52) U.S. Cl. ......................................... 398/156; 398/164

(58) Field of Classification Search .................. 398/115, 398/116, 140, 141, 156, 164
See application file for complete search history.

(56) References Cited

U.S. PATENT DOCUMENTS

| | | | |
|---|---|---|---|
| 4,554,673 A * | 11/1985 | Stevens .......................... | 375/356 |
| 4,748,617 A | 5/1988 | Drewlo | |
| 4,979,138 A | 12/1990 | Arrathoon | |
| 5,054,873 A * | 10/1991 | Davis et al. ..................... | 385/27 |
| 5,497,465 A | 3/1996 | Chin et al. | |
| 6,016,211 A | 1/2000 | Szymanski et al. | |
| 6,163,642 A | 12/2000 | Huppenthal | |
| 6,226,296 B1 * | 5/2001 | Lindsey et al. ................ | 370/401 |
| 6,249,363 B1 | 6/2001 | Arita et al. | |
| 6,316,286 B1 | 11/2001 | Trezza | |
| 6,453,406 B1 * | 9/2002 | Sarnikowski et al. .......... | 712/11 |
| 6,650,803 B1 * | 11/2003 | Ramaswami et al. .......... | 385/17 |
| 7,480,461 B2 * | 1/2009 | Thiele ........................... | 398/116 |
| 2002/0066792 A1 * | 6/2002 | Guthery et al. ................ | 235/492 |
| 2003/0223756 A1 * | 12/2003 | Tatum et al. ................... | 398/135 |
| 2004/0208600 A1 * | 10/2004 | Guenter et al. ................ | 398/135 |

FOREIGN PATENT DOCUMENTS

| | | |
|---|---|---|
| EP | 0437161 A2 | 7/1991 |
| WO | 01/98808 A1 | 12/2001 |
| WO | 02054269 A1 | 7/2002 |

OTHER PUBLICATIONS

Office Action from European Application No. 11 157 073.5-2415 dated Aug. 16, 2011, 8 pages.
Cochet, Bertrand; Supplementary European Search Report dated Dec. 17, 2007; 2 pgs.
Partial European Search Report from related EP Patent Application No. 11157073.5; dated Apr. 8, 2011; 3 pages.

* cited by examiner

*Primary Examiner* — Nathan Curs
(74) *Attorney, Agent, or Firm* — Brundidge & Stanger, P.C.

(57) ABSTRACT

An optical data processing network having an optical network interface is disclosed. The optical data processing network includes a first multi-processor system and a second multi-processor system. The first multi-processor system includes a first set of processors and a first set of optical network interfaces electrically coupled to the first set of processors. Similarly, the second multi-processor system includes a second set of processors and a second set of optical network interfaces electrically coupled to the second set of processors. An optical cable is connected between the first set and the second set of optical network interfaces. The first multi-processor system communicates with the second multi-processor system via the optical cable.

22 Claims, 2 Drawing Sheets

DATA PROCESSING NETWORK HAVING AN OPTICAL NETWORK INTERFACE

PRIORITY CLAIM AND CROSS-REFERENCE TO RELATED PATENT APPLICATIONS

The present application is a Continuation of U.S. patent application Ser. No. 10/529,983, filed on Mar. 31, 2005, and entitled "Data Processing Network Having an Optical Network Interface," now U.S. Pat. No. 7,480,461 B2, filed as a Rule 371 of PCT Application No. US2003/026956, filed Aug. 28, 2003, which are incorporated herein by reference, which claims the benefit of U.S. Provisional Application No. 60/406,831 filed Aug. 29, 2002.

BACKGROUND OF THE INVENTION

1. Technical Field

The present invention relates to computer networks in general and in particular to optical computer networks. Still more particularly, the present invention relates to a data processing network having an optical network interface.

2. Description of the Related Art

In general, multi-processor systems are employed to solve problems that cannot be solved quickly or efficiently with single processor systems. All processors within a multi-processor system are typically interconnected to each other. Such interconnections are typically accomplished by a network switch connected to each processor that can switch signals from any processor to any other processor.

As the processing speed of processors become faster, the speed that they need to communicate with each other also increases in order to maintain optimum performance in a multi-processor system. The amount of data transferred among processors also increases as the speed of the processor increases. Thus, the network switches tend to become the bottle-neck of a multi-processor system and subsequently limit the overall performance of the multi-processor system.

Further, in some cases, the more processors there are in a multi-processor system, the more wires are needed to connect from processors to a network switch. As a result, the cabling becomes too bulky.

The present disclosure describes an improved data processing network having multi-processors.

SUMMARY OF THE INVENTION

In accordance with a preferred embodiment of the present invention, an optical data processing network includes a first multi-processor system and a second multi-processor system. The first multi-processor system includes a first set of processors and a first set of optical network interfaces electrically coupled to the first set of processors. Similarly, the second multi-processor system includes a second set of processors and a second set of optical network interfaces electrically coupled to the second set of processors. An optical cable is connected between the first set and the second set of optical network interfaces. The first multi-processor system communicates with the second multi-processor system via the optical cable.

The optical network interface is a single integrated component formed by two chips. The first chip uses optical circuitry with the various voltage and signal characteristics that are required for optical communication. The second chip uses electrical circuitry with the various voltage and signal characteristics that are required for electrical communication. The optical network interface is connected to both a processor and a fiber optic network. During operation, the first chip interfaces with the fiber optic network and the second chip interfaces with the processor to provide an optical channel between the processor and the fiber optic network.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Given the density that can be economically achieved with the use of vertical cavity surface emitting laser (VCSEL) technology, a solution for the above-mentioned bottle-neck problem of a multi-processor data processing network is to utilize a group of optical fibers that provides full-time point-to-point connections between every processor. Such solution reduces the overall complexity and expense of providing routing and switching functions required by most multi-processor data processing network today. An additional benefit is the degree of deterministic latency that can be supported with the hardwired connections from one processor to another.

Figure 1:
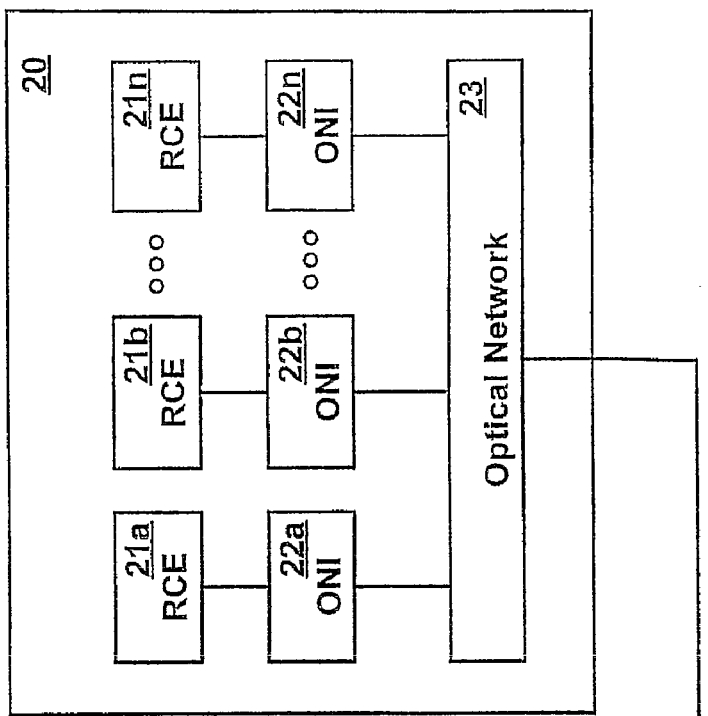
FIG. 1 is a block diagram of a data processing network, in accordance with a preferred embodiment of the present invention.
Figure 1:
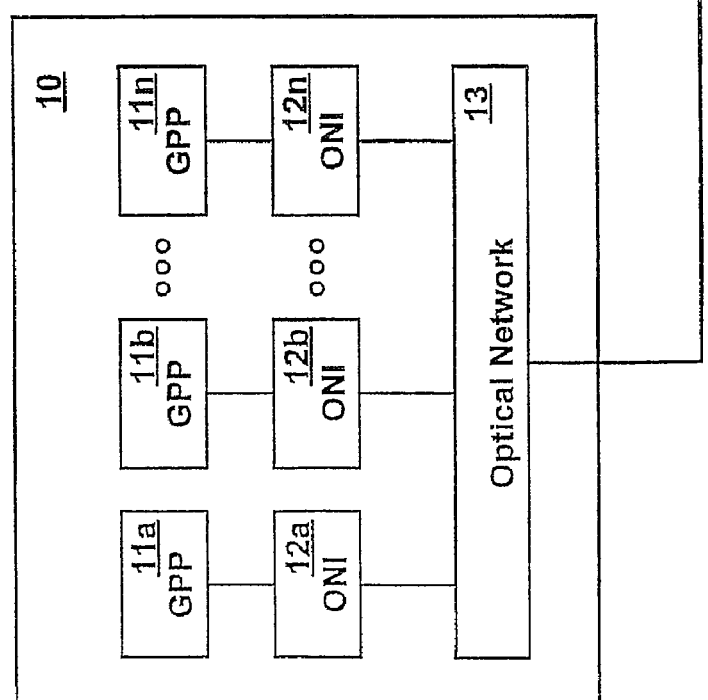

Referring now to the drawings and in particular to FIG. 1, there is illustrated a block diagram of a data processing network, in accordance with a preferred embodiment of the present invention. As shown, a data processing network 5 includes a multi-processor system 10 and a multi-processor system 20. Multi-process system 10 includes multiple general purpose processors (GPPs), such as GPPs 11a-11n. Each of GPPs 11a-11n is connected to a respective one of optical network interfaces 12a-12n. Optical network interfaces 12a-12n are connected to an optical network 13.

Similarly, multi-processor system 20 includes multiple reconfigurable compute engines (RCEs), such as RCEs 21a-21n. Each of RCEs 21a-21n is connected to a respective one of optical network interfaces 22a-22n. Optical network interfaces 22a-22n are also connected to an optical network 23.

Multi-processor system 10 and multi-processor system 20 communicate to each other via optical network 13, an optical cable 19 and optical network 23.

Figure 2:
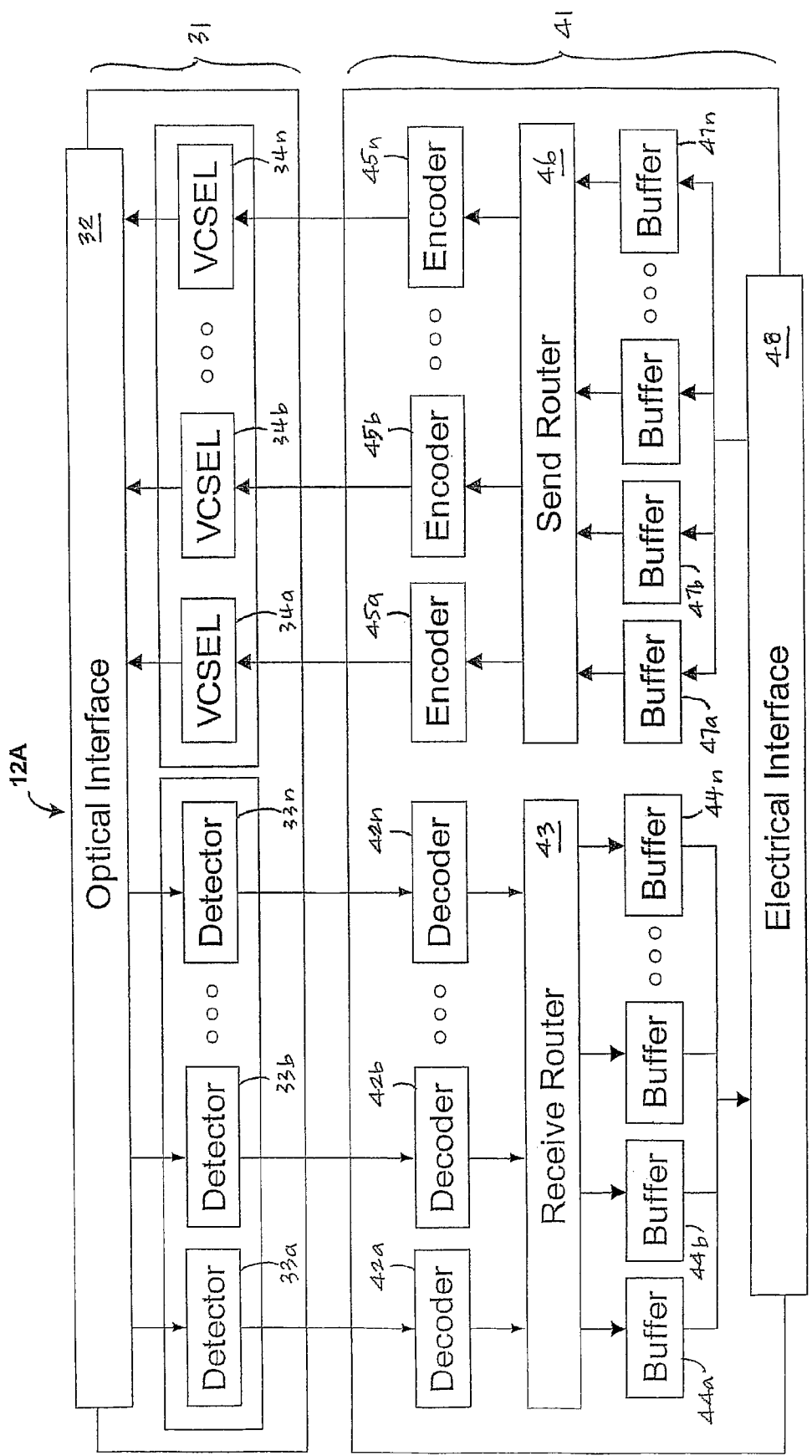
FIG. 2 is a block diagram of an optical network interface within the multi-processor system of FIG. 1, in accordance with a preferred embodiment of the present invention.

Preferably, optical network interfaces 12a-12n and 22a-22n are identical to each other. Hence, only optical network interface 12a will be further explained in details. With reference now to FIG. 2, there is depicted a block diagram of optical network interface 12a within multi-processor system 10 from FIG. 1, in accordance with a preferred embodiment of the present invention. In general, optical network interface 12a includes two components, namely, an optical component 31 and an electrical component 41. Optical component 31 includes an optical interface 32, multiple detectors 33a-33n, and multiple VCSELs 34a-34n. VCSELs 34a-34n in combination with detectors 33a-33n, which is intended to be connected to an optical network, transmits and receives optical signals to and from the optical network. Once an optical signal is received by optical interface 32, detectors 33a-33n translate the received optical signal to an electrical signal. VCSELs 34a-34n convert electrical signals to optical signals to be transmitted to optical interface 32.

Electrical component 41 includes circuitry for managing the networking functions of optical network interface 12a. Specifically, electrical component 41 includes multiple decoders 42a-42n, a receive router 43, multiple receive buffers 44a-44n, multiple encoders 45a-45n, a send router 46, multiple send buffers 47a-47n, and an electrical interface 48.

Electrical interface 48 receives messages (i.e., electrical signals) originated from, for example, GPP 11a (from FIG. 1). The messages are structured as a sequential set of parallel data words. The data words are presented to electrical interface 48 as 64 parallel electrical connections. Electrical interface 48 is designed to be compatible with the above-mentioned signal structure and forwards the data to one of several available send buffers 47a-47n. Send router 46 is subsequently signaled that one of send buffers 47a-47n has been loaded and is ready for transmission. The first several bytes of send buffers 47a-47n contain the priority and destination address for the contents of that buffer. Send router 46 then connects that buffer to one of encoders 45a-45n that is connected to the specified destination node's dedicated link. The data is then clocked into one of encoders 45a-45n where the data is encoded as an 8 B/10 B structure. Next, the data is converted from parallel data to a serial data stream. The serial data stream is then forwarded to one of VCSELs 34a-34n as a differential electrical signal preferably at a rate of 2.5 Gigabit per second.

In contrast, optical signals from an optical network are presented to optical interface 32 and the optical signals are forwarded to one of detectors 33a-33n in which the optical signals are converted to differential electrical signals in the form of a serial data stream. The rate of conversion is preferably 2.5 gigabits per second. The serial data stream is then forwarded to one of decoders 42a-42n in which the serial data stream is converted to a corresponding set of parallel data. The 8 B/10 B encoding is then removed from the parallel data to recover the data. The data is then forwarded to receive router 43 where the data is directed into an available buffer. When message has been received, GPP 11a is signaled. Once GPP 11a indicates that it is ready to accept messages, electrical interface 48 performs the final conversion to make the data compatible with the interface of GPP 11a.

It is possible to modify the operation of the protocol to support a zero-copy transfer of data, if necessary. In such a case, a destination node is signaled by a source node. The size of the message is then communicated. Once the source node receives a "clear to send" signal from the destination node, the paths is established through the send and receive routers and the transmission of data is initiated. The path is maintained until the transmission is complete.

Due to differences in technologies and associated manufacturing processes, optical component 31 and electrical component 41 are preferably manufactured as separate components. Each of optical component 31 and electrical component 41 is designed with complementary physical and electrical characteristics. The process of manufacturing optical component 31 and electrical component 41 is described in details in the U.S. Pat. No. 6,316,286 B1, the pertinent of which is incorporated by reference herein. Bump bonding of the chip having optical component 31 and the chip having electrical component 41 may be employed to form the final integrated component, that is, optical network interface 12a.

As has been described, the present invention provides a multi-processor network system having an optical network interface. Although processors are used to illustrate the preferred embodiment of the present invention, it is understood by those skilled in the art that the processor can be replaced by similar devices such as gateways, field programmable gate arrays, sensors, etc.

While the invention has been particularly shown and described with reference to a preferred embodiment, it will be understood by those skilled in the art that various changes in form and detail may be made therein without departing from the spirit and scope of the invention.

What is claimed is:

1. A multi-processor system comprising:
a plurality of processing devices; and
a plurality of optical network interfaces electrically coupled to the plurality of processing devices, wherein at least one of the plurality of optical network interfaces includes:
an optical component having:
an optical interface adapted to connect to an optical device capable of transmitting and receiving optical signals;
a detector array, coupled to the optical interface, configured to translate a first set of optical signals received from the optical interface to corresponding differential electrical signals in the form of a first serial data stream; and
a vertical cavity surface emitting laser (VCSEL) array, coupled to the optical interface, configured to translate a second serial data stream of electrical signals to a corresponding second set of optical signals to be transmitted to the optical interface;
and
an electrical component having:
a decoder array, coupled to the detector array, configured to convert the first serial data stream to a corresponding first set of parallel data;
a receive router coupled to the decoder array;
a plurality of receive buffers, coupled to the receive router, wherein the receive router directs the first set of parallel data to at least one of the receive buffers;
an electrical interface adapted to connect to at least one of the plurality of processing devices capable of transmitting and receiving electrical signals, wherein the electrical interface is configured to receive the first set of parallel data from the at least one of the receive buffers and to send the first set of parallel data to at least one of the plurality of processing devices;
a plurality of send buffers, configured to receive a second set of parallel data from the electrical interface in response to the electrical interface receiving the second set of parallel data from at least one of the plurality of processing devices;
a send router, coupled to the plurality of send buffers; and
an encoder array, coupled to the VCSEL array, configured to convert the second set of parallel data to the second serial data stream and to send the second serial data stream to the VCSEL array as a differential electrical signal, wherein the send router is configured to direct the second set of parallel data to at least one encoder of the encoder array.

2. The multi-processor system of claim 1, further comprising an optical network connected to the plurality of optical network interfaces.

3. The multi-processor system of claim 2, wherein the optical network is configured to connect to another optical network via an optical cable.

4. The multi-processor system of claim 1, wherein the plurality of processing devices comprise gateways.

5. The multi-processor system of claim 1, wherein the plurality of processing devices comprise field programmable gate arrays.

6. The multi-processor system of claim 1, wherein the plurality of processing devices comprise sensors.

7. The multi-processor system of claim 1, wherein the optical component and the electrical component are connected to each other via bump bonding.

8. The multi-processor system of claim 1, wherein the decoder is configured to remove 8B/10B encoding from parallel data.

9. The multi-processor system of claim 1, wherein the encoder array is configured to encode parallel data as an 8B/10B structure.

10. A method comprising:
receiving a first set of parallel data from a processing device at an electrical interface of an optical network interface;
buffering the first set of parallel data in a send buffer of a plurality of send buffers;
connecting the send buffer of the plurality of send buffers to an encoder of an encoder array using a send router;
converting the first set of parallel data to a first serial data stream in the encoder;
transforming the first serial data stream to an optical signal;
transmitting the optical signal to an optical network through an optical interface of the optical network interface;
receiving the optical signal at an optical interface of a second optical network interface;
transforming the optical signal to a second serial data stream;
converting the second serial data stream to a second set of parallel data in a decoder of a decoder array;
connecting the decoder of the decoder array to a receive buffer of a plurality of receive buffers using a receive router;
buffering the second set of parallel data in the receive buffer; and
sending the second set of parallel data to a second processing device, at an electrical interface of the second optical network interface.

11. The method of claim 10, wherein the transforming the first serial data stream to an optical signal is by a vertical cavity surface emitting laser (VCSEL).

12. The method of claim 10, wherein both the first optical network interface and the second optical network interface contain an electrical component and an optical component, and wherein the electrical component and the optical component are connected to each other by bump bonding.

13. An optical network interface apparatus having both electrical components and optical components, the optical network interface apparatus comprising:
means for receiving a first set of parallel data from a processing device;
means for buffering the first set of parallel data;
a send router means for connecting the means for buffering to an encoder means for converting the first set of parallel data to a first serial data stream, wherein the encoder means comprises an encoder array;
means for converting the first serial data stream to a first optical signal;
means for transmitting the first optical signal through an optical network;
means for receiving a second optical signal from the optical network;
a decoder means for converting the second optical signal to a second serial data stream, wherein the decoder means comprises a decoder array;
means for converting the second serial data stream to a second set of parallel data;
a receive router means for connecting the means for converting the second serial data stream to a second set of parallel data to a means for buffering the second set of parallel data; and
means for sending the second set of parallel data to a processing device.

14. The optical network interface apparatus of claim 13, wherein the electrical components and the optical components are connected by bump bonding.

15. An optical network interface, comprising:
an optical component comprising a first chip and an electrical component comprising a second chip, wherein the first chip is bonded to the second chip to comprise a single integrated chip;
wherein the optical component comprises:
an optical interface adapted to be in communication with an optical device capable of transmitting and receiving optical signals;
a detector array, in communication with the optical interface, configured to translate a first set of optical signals received from the optical interface to a first set of electrical signals representing a first set of data; and
a laser array, in communication with the optical interface, configured to translate a second set of electrical signals representing a second set of data to a second set of optical signals to be transmitted to the optical interface; and
wherein the electrical component comprises:
an electrical interface adapted to be in communication with at least one processing device capable of transmitting and receiving electrical signals, wherein the electrical interface is configured to receive the first set of data and to send the first set of data to at least one processing device;
an encoder array, communicably connected with the laser array, configured to convert the second set of data to a serial data stream and to send the serial data stream to the laser array;
a decoder array, communicably connected with the detector array, configured to convert the first set of electrical signals comprising a first serial data stream to a first set of parallel data;
a receive router communicably connected with the decoder array;
a plurality of receive buffers, communicably connected with the receive router, wherein the receive router is configured to direct the first set of parallel data to the plurality of receive buffers;
a plurality of send buffers, configured to receive a second set of parallel data from the electrical interface; and
a send router, communicably connected with the plurality of send buffers and the encoder array, configured to route the second set of parallel data to the encoder array.

16. The optical network interface of claim 15 wherein the laser array comprises an array of vertical cavity surface emitting lasers (VCSELs).

17. A method comprising:
receiving a first set of data from a first processing device in the form of a first set of electrical signals;
buffering the first set of data in a send buffer;
connecting the send buffer to an encoder using a send router;
connecting a decoder to a receive buffer using a receive router;
signaling a destination node to communicate a size of the first set of data;
receiving a clear-to-send signal from the destination node;
establishing a path through the send router and the receive router for communicating the first set of data in a zero-copy transfer of data;
transforming the first set of data to an optical signal;
transmitting the optical signal;
receiving the optical signal;
transforming the optical signal to a second set of data in the form of a second set of electrical signals; and
sending the second set of data to a second processing device.

18. A method comprising:
receiving a first set of parallel data from a processing device at an electrical interface of an optical network interface;
buffering the first set of parallel data in a send buffer of a plurality of send buffers;
connecting the send buffer of the plurality of send buffers to an encoder of an encoder array using a send router;
converting the first set of parallel data to a first serial data stream in the encoder;
transforming the first serial data stream to an optical signal;
transmitting the optical signal to an optical network through an optical interface of the optical network interface;
receiving a second optical signal at the optical interface;
transforming the second optical signal to a second serial data stream;
converting the second serial data stream to a second set of parallel data in a decoder of a decoder array;
connecting the decoder of the decoder array to a receive buffer of a plurality of receive buffers using a receive router;
buffering the second set of parallel data in the receive buffer; and
sending the second set of parallel data to the processing device, at the electrical interface of the optical network interface.

19. The method of claim 18, wherein the transforming the first serial data stream to an optical signal is by a vertical cavity surface emitting laser (VCSEL).

20. The method of claim 18, wherein the optical network interface comprises an electrical component and an optical component, and wherein the electrical component and the optical component are connected to each other by bump bonding.

21. A method comprising:
receiving a set of data from a first processing device in the form of a first set of electrical signals;
buffering the set of data in a send buffer;
connecting the send buffer to an encoder using a router;
requesting a communication comprising a size of the set of data from a source node;
receiving a clear-to-send signal at the source node;
establishing a path through the router for communicating the data in a zero-copy transfer of data;
transforming the set of data to an optical signal; and
transmitting the optical signal from the source node.

22. A method comprising:
receiving a communication comprising a size of a data to be sent to a destination node;
connecting a decoder to a receive buffer using a receive router;
sending a clear-to-send signal from the destination node;
establishing a path through a router for communicating the data in a zero-copy transfer of data from the source node to the destination node;
receiving the data at the destination node as an optical signal transmitted by the source node;
transforming the optical signal to a set of data in the form of a set of electrical signals; and
sending the set of data to a processing device.

* * * * *